US008297808B2

(12) United States Patent
Yuan

(10) Patent No.: US 8,297,808 B2
(45) Date of Patent: Oct. 30, 2012

(54) ILLUMINATION DEVICE

(75) Inventor: Hui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 476 days.

(21) Appl. No.: 12/752,135

(22) Filed: Apr. 1, 2010

(65) Prior Publication Data

US 2011/0157904 A1 Jun. 30, 2011

(51) Int. Cl.
*F21S 4/00* (2006.01)
*B60Q 1/06* (2006.01)

(52) U.S. Cl. ................ 362/428; 362/249.09; 362/249.1; 362/410; 362/413

(58) Field of Classification Search .. 362/249.09–249.1, 362/410, 413, 427–428
See application file for complete search history.

(56) References Cited

U.S. PATENT DOCUMENTS

| | | | | |
|---|---|---|---|---|
| 7,407,304 | B2 * | 8/2008 | Tasson et al. | 362/249.07 |
| 8,066,399 | B2 * | 11/2011 | Yu et al. | 362/183 |
| 2010/0103659 | A1 * | 4/2010 | Chen | 362/231 |
| 2011/0051434 | A1 * | 3/2011 | Lin | 362/396 |

* cited by examiner

*Primary Examiner* — Diane Lee
*Assistant Examiner* — Sean Gramling
(74) *Attorney, Agent, or Firm* — Altis Law Group, Inc.

(57) ABSTRACT

An illumination device includes an adjusting apparatus including a gear wheel element and a rotation element rotatably connected to the gear wheel element. A support portion is configured for supporting the adjusting apparatus, and comprises at least a driving pole which is moveable. At least one pair of illumination portion is rotatably connected to the adjusting apparatus via the two opposite sides of the gear wheel element. The rotation element is rotatably connected to the at least one driving pole. When at least one driving pole is driven to move up or down relative to the support portion, the gear wheel element is driven to rotate relative to the rotation element by the at least one driving pole, thereby driving at least one illumination portion to rotate.

9 Claims, 6 Drawing Sheets

ILLUMINATION DEVICE

BACKGROUND

1. Technical Field

The present disclosure relates to illumination devices and, particularly, to an illumination device with an adjusting apparatus.

2. Description of Related Art

Some illumination devices include an illumination portion, a deformable connection pole, and a lamp holder. Users can adjust the deformable connection pole to change an illumination angle and an illumination range of the illumination device. However, a long time operation on the connection pole results in a weak deformability for the connection pole, thereby shortening the service life of the illumination device.

Therefore, what is needed is an illumination device with an adjusting apparatus to overcome the described shortcoming.

DETAILED DESCRIPTION

Figure 1:
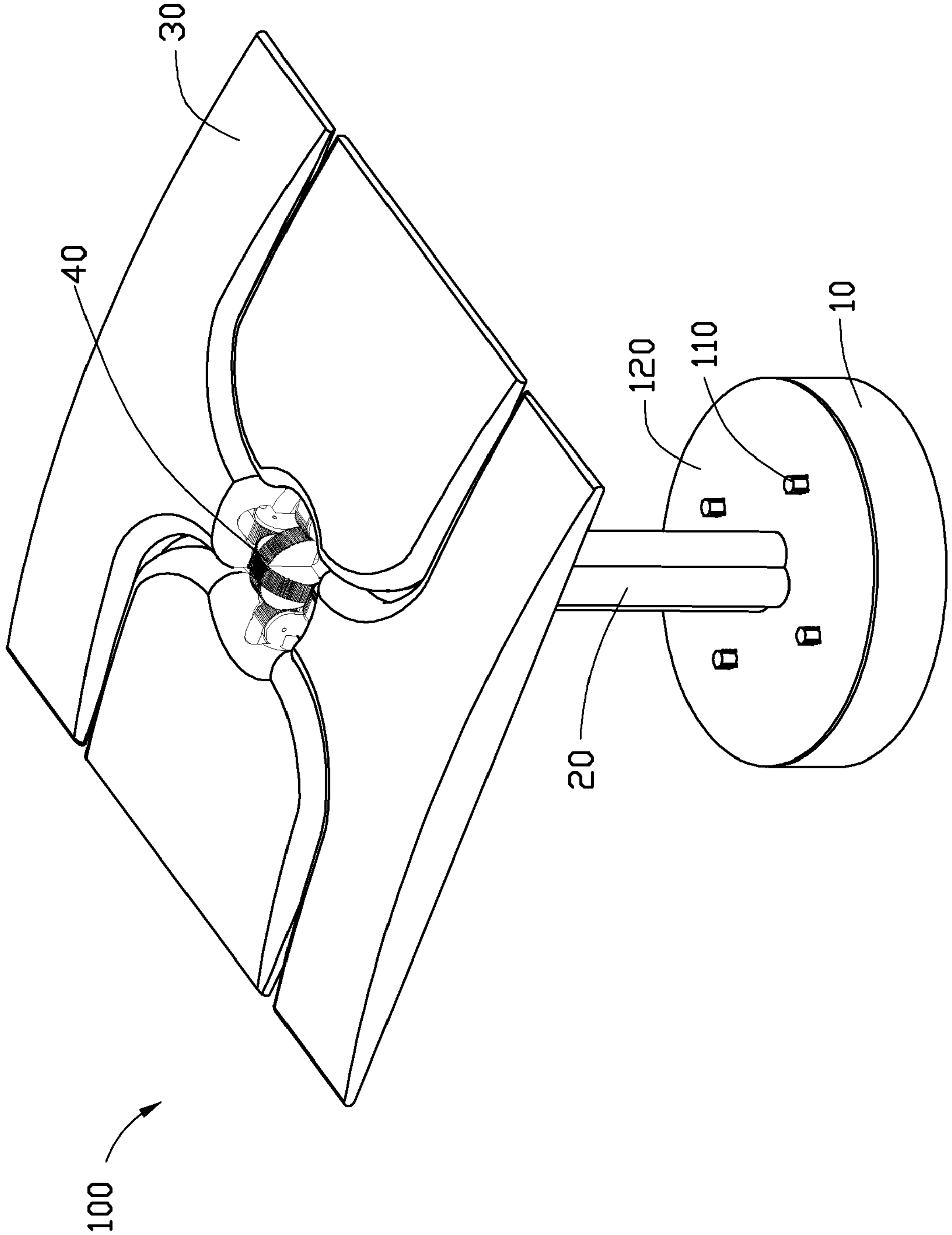
FIG. 1 is an isometric view of one embodiment of an illumination device including an adjusting apparatus.
Figure 2:
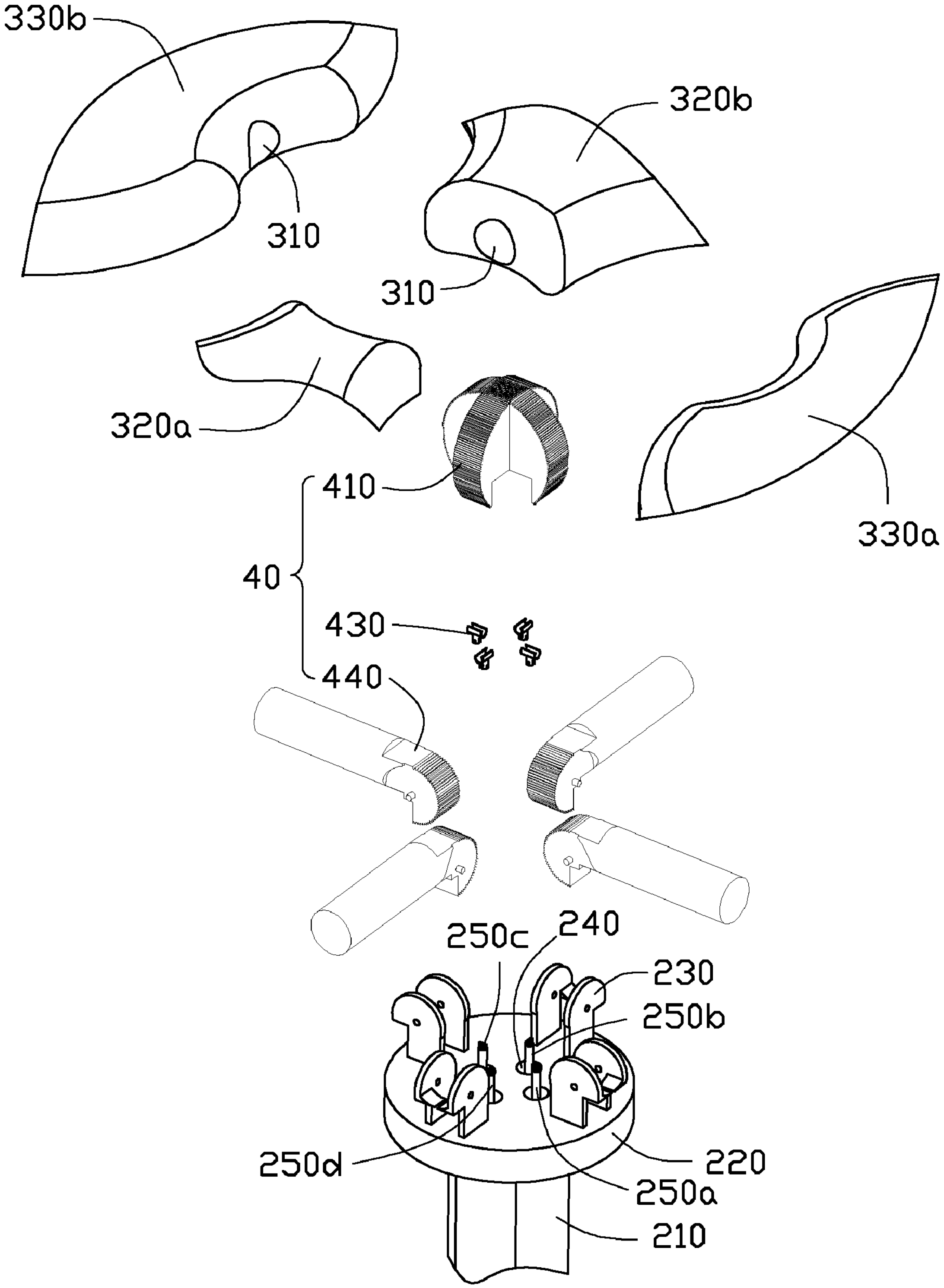
FIG. 2 is a partial, exploded view of the illumination device of FIG. 1.

Referring to FIGS. 1-2, an embodiment of an illumination device 100 is illustrated. The illumination device 100 includes a lamp holder 10, a support portion 20, an illumination portion 30, and an adjusting apparatus 40. The illumination portion 30 is rotatably connected to the support portion 20 by the adjusting apparatus 40. The support portion 20 is fixed to the lamp holder 10, and is configured for supporting the illumination portion 30 and the adjusting apparatus 40.

The illumination portion 30 includes at least two luminophors. In the embodiment, the illumination portion 30 includes two pairs of the luminophors 320*a*/320*b*, 330*a*/330*b*. The luminophors 320*a*/320*b* cooperate with the luminophors 330*a*/330*b* to form the illumination portion 30 of square-shape. The number of the luminophors 320*a*/320*b* and the luminophors 330*a*/330*b* is not limited to herein and can be changed as needed or desired.

The lamp holder 10 is a circular platform, and is configured for contacting a support surface, such as a desktop. The lamp holder 10 includes four adjusting elements 110 and a driving device (not shown) for driving the adjusting apparatus 40. The driving device is located inside of the lamp holder 10, and is connected to the adjusting apparatus 40. The four adjusting elements 110 are set on the top surface 120 of the lamp holder 10, and are connected to the driving device. In the embodiment, the driving device can be a hydraulic pressure driving device or an air pressure driving device. Users can adjust the four adjusting elements 110 to control the driving device to drive the adjusting apparatus 40 to adjust the angle of the luminophors (320*a*, 320*b*, 330*a* and 330*b*) respectively.

The support portion 20 is fixed to the lamp holder 10, and includes a column portion 210, a supporter 220, four support elements 230 located on the supporter 230, and four driving poles (250*a*, 250*b*, 250*c* and 250*d*). The supporter 220 is fixed to one end of the column portion 210 away from the lamp holder 10. The supporter 220 defines four perforations 240 parallel to the axes of the four column portion 210. The four perforations 240 pass through the column portion 210 to communicate with the inner of the lamp holder 10. Each of the perforations 240 is for receiving a driving pole 250. The driving poles (250*a*, 250*b*, 250*c* and 250*d*) are passed through the perforations 240 to connect to the driving device and the adjusting apparatus 40. The driving device is configured for driving the driving poles (250*a*, 250*b*, 250*c* and 250*d*) to move up/down relative to the perforations 240, thereby changing the length of the driving poles (250*a*, 250*b*, 250*c* and 250*d*) extended out of the perforations 240. When the driving poles (250*a*, 250*b*, 250*c* and 250*d*) are not driven by the driving device, the lengths of the driving poles (250*a*, 250*b*, 250*c* and 250*d*) extended out of the perforations 240 are not changed. When the driving poles (250*a*, 250*b*, 250*c* and 250*d*) are driven by the driving device, the length of the driving poles (250*a*, 250*b*, 250*c* and 250*d*) extended out of the perforations (250*a*, 250*b*, 250*c* and 250*d*) are changed, and the driving poles (250*a*, 250*b*, 250*c* and 250*d*) drive the adjusting apparatus 40 to rotate along the landscape orientation.

The adjusting apparatus 40 includes a gear wheel element 410, four rotation elements 430, and four support poles 440 meshed with the gear wheel element 410. The rotation elements 430 are rotatably connected to the gear wheel element 410. The luminophors (320*a*, 320*b*, 330*a* and 330*b*) are fixed to the four support poles 440 respectively. When the gear wheel element 410 is rotated relative to the rotation elements 430, the support poles 440 are driven to rotate by the gear wheel element 410, thereby adjusting the angles of the luminophors (320*a*, 320*b*, 330*a* and 330*b*). In the embodiment, the number of the rotation elements 430 and the support poles 440 is four. In another embodiment, the number of the rotation elements 430 and the support poles 440 is not limited herein and can be changed as needed or desired.

Figure 3:
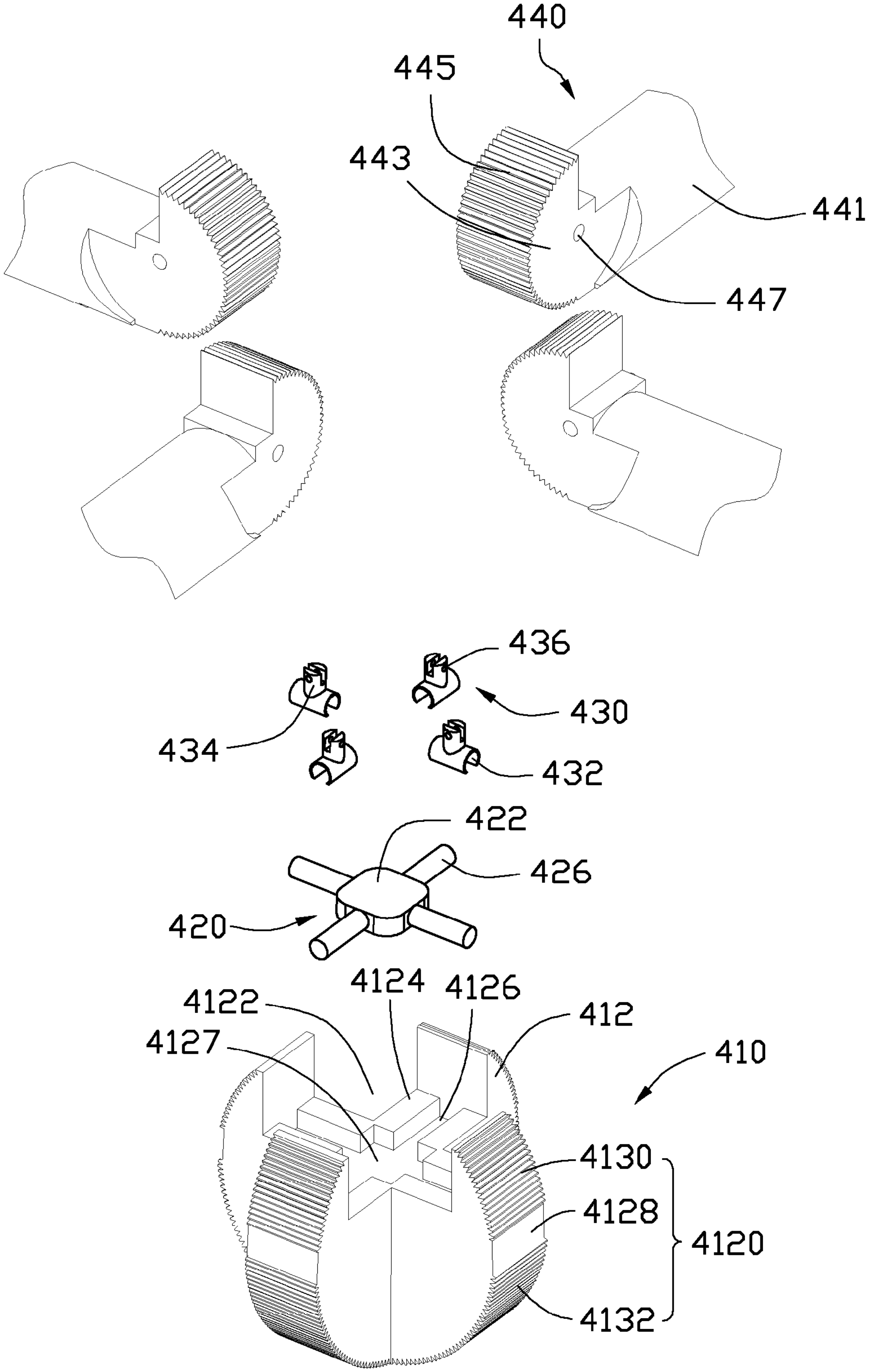
FIG. 3 is a partial, enlarged view of the adjusting apparatus of FIG. 2, from an another aspect.

Referring also to FIG. 3, the gear wheel element 410 includes a connection element 420 and four gears 412. Each of the four gears 412 is substantially C shaped. The connection element 420 includes square positioning block 422 and four column protrusions 426 fixed to the positioning block 422 and extend along four cross-shaped directions, respectively, from sides of the positioning block 422. The four protrusions 426 are coplanar. The four gears 412 are arranged in a cross layout with each one being opposite to another one into two pairs, and the two in each pair are arranged opposite to each other with their gear surfaces 4120 facing away from each other. Every two gears 412 of each pair define a cutout 4122. Two bottom end surfaces 4124 of the two cutouts 4122 are coplanar. Every two bottom end surfaces 4124 cooperate to form a groove 4126. The two grooves 4126 are perpendicularly intersected to form a receiving groove 4127. The receiving groove 4127 is configured for receiving and fixing the connection element 420. In the embodiment, the receiving groove 4127 cooperates with the connection element 420 to form an interference fitting. The gear 412 is an external gear. The portion of the gear surface 4120 of each of the four gears 412 parallel to another gear is cut to from a tangential plane 4128. The gear surface 4120 is divided into a cambered first gear surface 4130 and a cambered second gear surface 4132 by the tangential plane 4128.

Each of the rotation elements 430 includes a housing portion 432 and a connection portion 434 fixed to the housing portion 432. The housing portion 432 is cambered, and is rotatably placed over the column protrusion 426. One end of the connection portion 434 away from the housing portion 432 defines a pivot hole 436. The connection portion 434 is pivoted into the driving pole 250 by the pivot hole 436.

The support pole 440 is L shaped. Each of the support poles 440 includes a column connection pole 441 and a cam 443 fixed to one end of the connection pole 441. The cam 443 is approximately semicircular, and includes a cambered gear surface 445. The diameter of the cam 443 exceeds that of the connection pole 441. The cam 443 defines an axel hole 447. The support pole 440 is rotatably connected to support element 230 by the axel hole 447.

Each of the illumination portions 30 defines a circular through hole 310. The illumination portions 30 are fixed to one end of the connection pole 441 away from the cam 443 by the through holes 310.

When assembling, the rotation elements 430 are placed over the protrusions 426 respectively, and are rotatably connected to the driving poles 250 by the pivot hole 436. The support poles 440 are rotatably connected to the support elements 230, thereby driving the cambered gear surfaces 445 contacted with the tangential planes 4128. The luminophors (320*a*, 320*b*, 330*a* and 330*b*) are fixed to the support poles 440.

Figure 4:
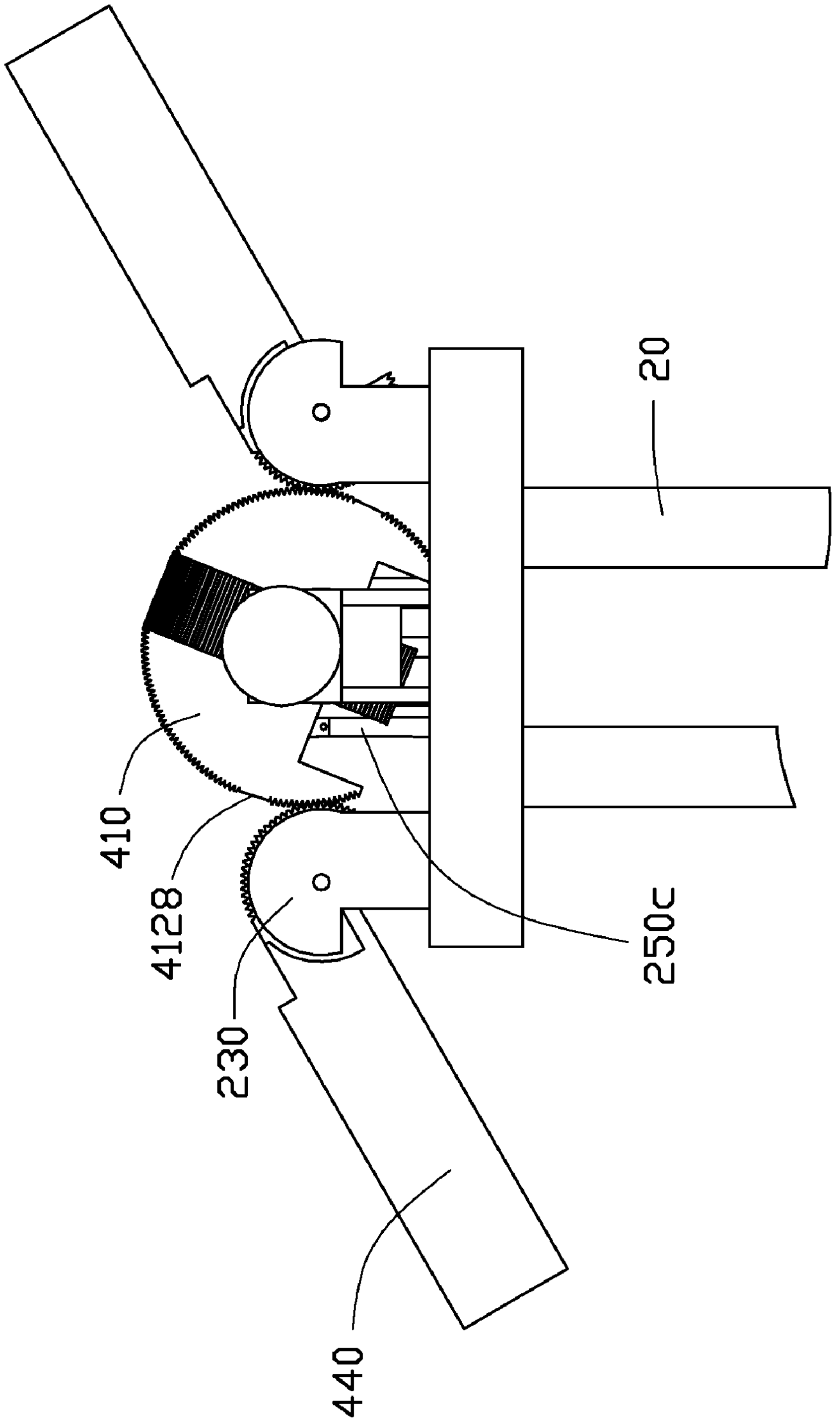
FIG. 4 is a state view of the adjusting apparatus of the illumination device of FIG. 1.
Figure 5:
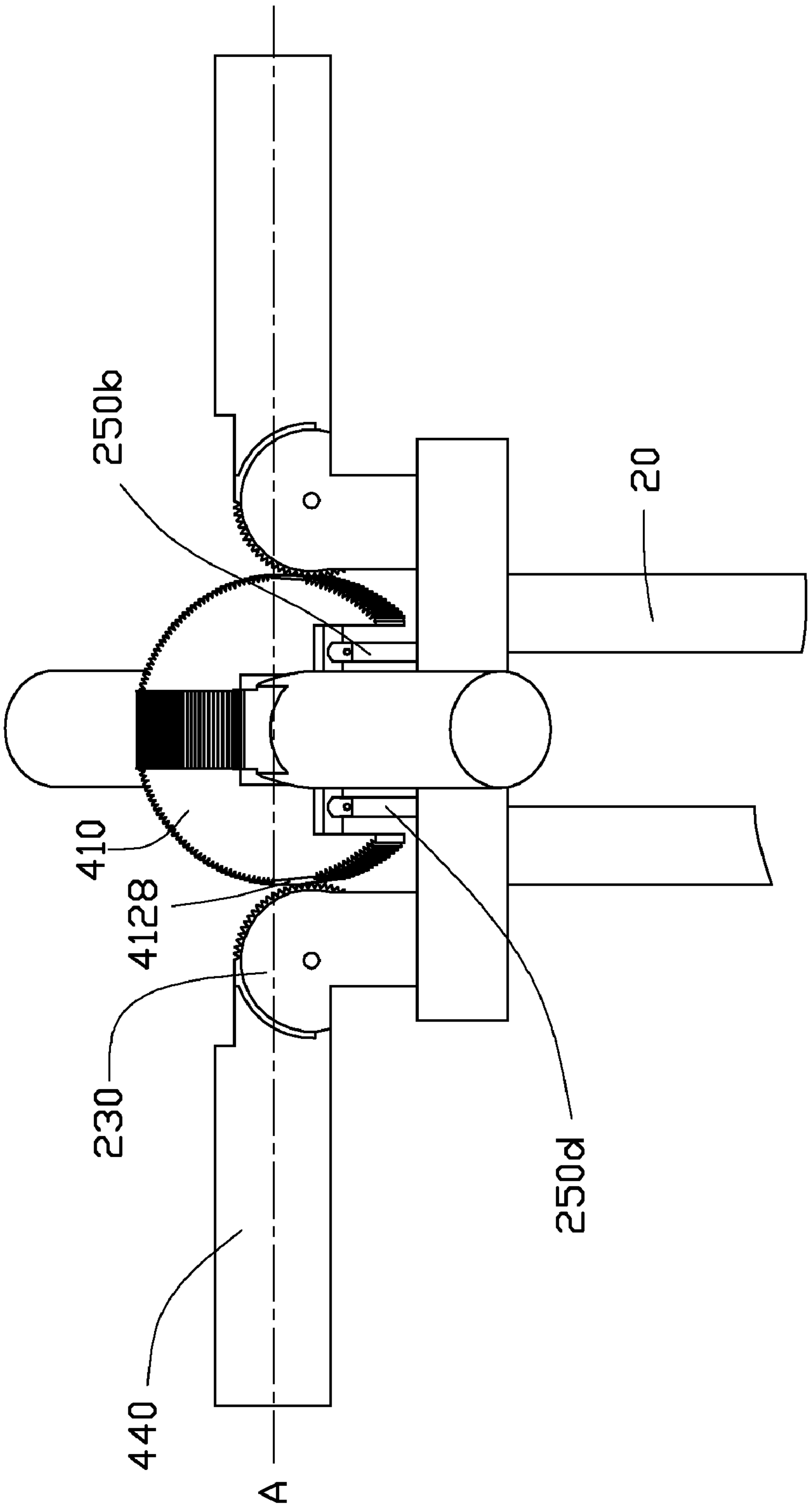
FIG. 5 is a schematic diagram of the illumination device of FIG. 1, showing the adjusting apparatus from an another aspect.
Figure 6:
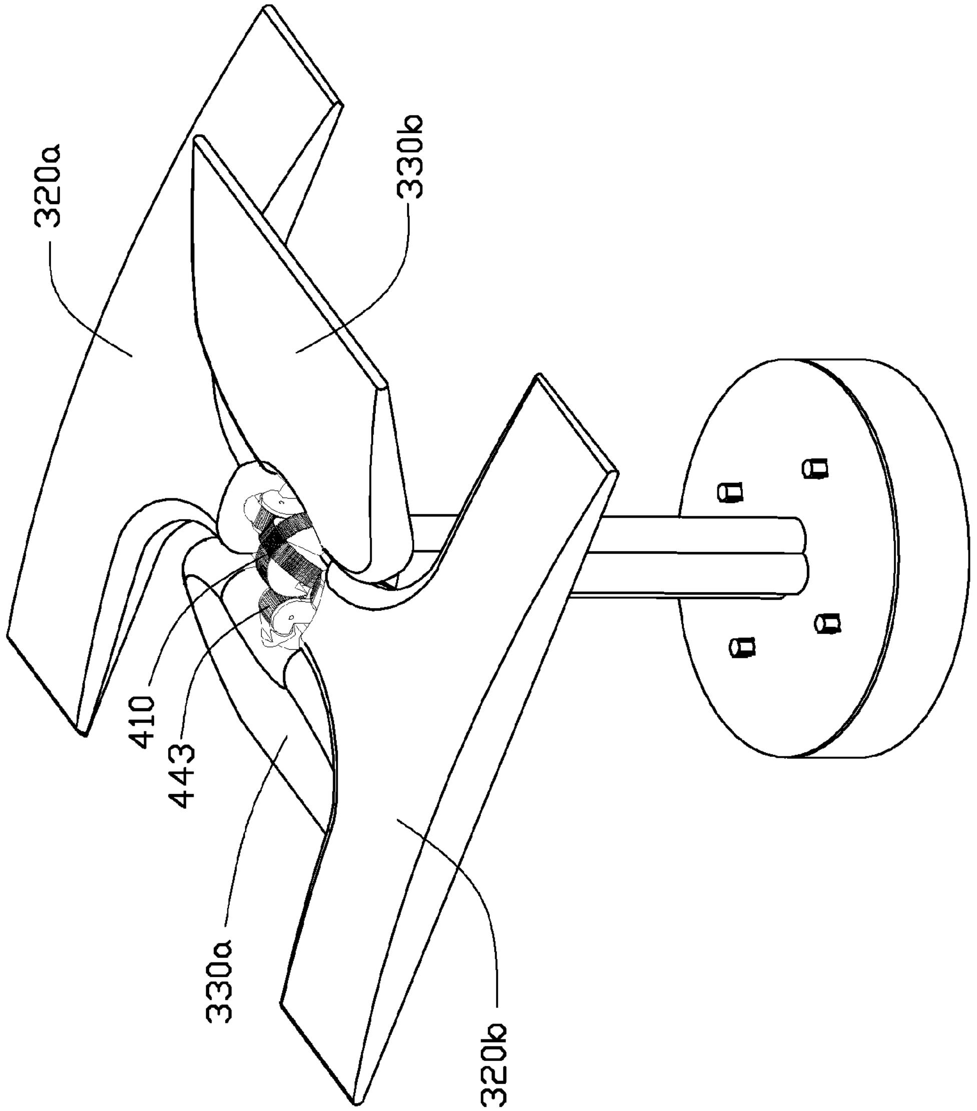
FIG. 6 is a schematic diagram of the illumination device of FIG. 1, after the illumination device is adjusted.

Referring also to FIGS. 4-6, after assembling, when users operate the adjusting elements 110 to control the driving device to pull the driving pole 250*c* corresponding to the luminophor 330*b*, the length of the driving pole 250*c* extended out of the perforation 240 increases, and the length of the driving poles 250*a* opposite to the driving pole 250*c* extended out of the perforation 240 decreases, thereby driving the gear wheel element 410 to clockwise rotate along the line A. When the second gear surface 4132 of the gear wheel element 410 corresponding to the luminophor 330*b* is meshed with the gear surface 445 of the support pole 440, the support pole 440 corresponding to the luminophor 330*b* is driven to move up, thereby driving the luminophor 330*b* to go up. Simultaneously, the first gear surface 4130 of the gear wheel element 410 away from the luminophor 330*b* is rotated up to mesh with the gear surface 445 of the support pole 440, thereby driving the luminophor 330*a* to go down.

Because the remaining two driving poles 250*b*, 250*d* are not driven by the driving device, the lengths of the two driving poles 250*b*, 250*d* extended out of the perforations 240 are not changed. The two driving poles 250*b*, 250*d* are configured for supporting the gear wheel element 410. When the gear wheel element 410 is clockwise rotated along the line A, because the gear surface 445 of the support pole 440 is also contacted with the tangential plane 4128 of the gear wheel element 410, the luminophors 320*a*, 320*b* corresponding to the support pole 440 have no movement, and the rotation element 430 connected to the two driving poles 250*b*, 250*d* is rotated relative to the column protrusion 426 of the connection element 420.

So, when the users operate the adjusting element 110 to control the driving device to pull the driving pole 250*b*, 250*d* down corresponding to the luminophors 320*a*, 320*b*, the luminophors 320*a*, 320*b* are adjusted, and the luminophors 330*a*, 330*b* have no movement.

Accordingly, the users can apply the force on the adjusting apparatus 40 to adjust the angle of the illumination portion 30, thereby changing the illumination angle and the illumination range of the illumination device 100.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An illumination device comprising:

an adjusting apparatus comprising a gear wheel element and a rotation element rotatably connected to the gear wheel element;

a support portion configured for supporting the adjusting apparatus, and comprising at least one driving pole which is moveable;

at least one pair of illumination portions rotatably connected to the adjusting apparatus via two opposite sides of the gear wheel element;

wherein, the rotation element is rotatably connected to at least one driving pole, when the at least one driving pole is driven to move up or down relative to the support portion, the gear wheel element is driven to rotate relative to the rotation element by the at least one driving pole, thereby driving the at least one pair of illumination portions to rotate, wherein the gear wheel element comprises four gears arranged in a cross layout, each gear is paired with and opposite to another gear and their gear surfaces face away from each other, each gear surface is cambered; the number of the at least one pair illumination portions is two, each illumination portion is rotatably meshed with the gear surface of one of the four gears.

2. The illumination device as described in claim 1, wherein each of the gears forms a tangential plane and the gear surface of the gear is divided into a first gear surface and a second gear surface by the tangential plane.

3. The illumination device as described in claim 2, wherein the adjusting apparatus further comprises four support poles rotatably connected to the support portion, and rotatably meshed with the four gears, and each illumination portion is rotatably connected to one of the four support poles and meshed with the corresponding gear with the support pole.

4. The illumination device as described in claim 3, wherein each of the support poles comprises a connection pole and a cam connected to one end of the connection pole, the cam defines a gear surface, the support pole is rotatably meshed with the gear surface of the corresponding gear, and the corresponding illumination portion is connected to one end of the connection pole away from the cam.

5. The illumination device as described in claim 1, wherein the gear wheel element further comprises a connection element, and the rotation element is rotatably connected to the connection element.

6. The illumination device as described in claim 5, wherein the rotation element comprises a housing portion, and the rotation element is rotatably placed over the connection element by the housing portion.

7. The illumination device as described in claim 1, wherein when at least one of the driving pole is driven to move up or down relative to the support portion, the rotation element and the at least one pair of the illumination portions connected to the opposite side of the rotation element are rotated.

8. The illumination device as described in claim 1, wherein the support portion further comprise a lamp holder and a supporter fixed to the lamp holder, and at least one pair of the illumination portions is rotatably connected to the supporter by the adjusting apparatus.

9. The illumination device as described in claim 8, wherein the supporter defines at least one perforation penetrating the supporter to communicate with the inner of the lamp holder, and the at least one driving pole is received into the perforation and is movable relative to the perforation.

* * * * *